(12) United States Patent
Lymberopoulos et al.

(10) Patent No.: US 8,548,497 B2
(45) Date of Patent: Oct. 1, 2013

(54) INDOOR LOCALIZATION USING COMMERCIAL FREQUENCY-MODULATED SIGNALS

(75) Inventors: Dimitrios Lymberopoulos, Bellevue, WA (US); Jie Liu, Medina, WA (US); Nissanka Arachchige Bodhi Priyantha, Redmond, WA (US); Yin Chen, Baltimore, MD (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/328,613

(22) Filed: Dec. 16, 2011

(65) Prior Publication Data

US 2013/0157683 A1 Jun. 20, 2013

(51) Int. Cl.
*H04W 64/00* (2009.01)

(52) U.S. Cl.
USPC .................. 455/456.1; 455/404.2; 455/414.2; 455/456.3; 455/456.6; 455/41.2

(58) Field of Classification Search
USPC ............ 455/456.1, 404.2, 414.2, 456.3, 41.2, 455/456.6
See application file for complete search history.

(56) References Cited

U.S. PATENT DOCUMENTS

| | | | |
|---|---|---|---|
| 6,944,465 B2 | 9/2005 | Spain et al. | |
| 8,077,090 B1 | 12/2011 | Chintalapudi et al. | |
| 8,130,141 B2 * | 3/2012 | Pattabiraman et al. | .. 342/357.29 |
| 8,170,583 B2 * | 5/2012 | Shkedi | ........................ 455/456.1 |
| 8,174,931 B2 * | 5/2012 | Vartanian et al. | ............... 367/99 |
| 8,294,617 B2 * | 10/2012 | Rieger, III | ..................... 342/464 |
| 8,339,316 B1 * | 12/2012 | Mendis | ........................ 342/451 |
| 8,399,316 B2 * | 3/2013 | Vinet et al. | ..................... 438/157 |
| 2003/0008668 A1 * | 1/2003 | Perez-Breva et al. | ......... 455/456 |
| 2004/0252868 A1 * | 12/2004 | Nilsson | .......................... 382/124 |
| 2006/0125692 A1 * | 6/2006 | Wang et al. | .................... 342/451 |
| 2007/0026870 A1 | 2/2007 | Spain et al. | |
| 2007/0129084 A1 * | 6/2007 | Sylvain | ....................... 455/456.1 |
| 2008/0240070 A1 * | 10/2008 | Feher | ............................. 370/347 |
| 2008/0311870 A1 * | 12/2008 | Walley et al. | .............. 455/186.1 |
| 2009/0191897 A1 * | 7/2009 | Johnson et al. | ............. 455/456.3 |
| 2009/0322603 A1 * | 12/2009 | Liao | ......................... 342/357.12 |
| 2010/0029274 A1 * | 2/2010 | Deshpande et al. | ........ 455/435.3 |

(Continued)

OTHER PUBLICATIONS

Moghtadaiee, et al., "Indoor Localization Using FM Radio Signals: A Fingerprinting Approach", International Conference on Indoor Positioning and Indoor Navigation (IPIN), Sep. 21-23, 2011, pp. 1-4.

(Continued)

*Primary Examiner* — Kamran Afshar
*Assistant Examiner* — Mong-Thuy Tran (57) ABSTRACT

A commercial frequency-modulated (FM) radio signal indoor localization system and method for finding a location of a mobile embedded device (such as a smartphone) within a building. Indoor localization is performed by receiving commercial FM radio signals on the device, analyzing the signals using signal quality metrics, and generating signal quality vectors for each signal and signal quality metric used for the signal. The signal quality metric can be any physical signal quality indicator. The signal quality vectors are added to obtain a current location fingerprint. The current location fingerprint is compared to fingerprints stored in a fingerprint database. The location associated with the stored fingerprint that is the closest match to the current fingerprint location is designated as the current location in the building of the mobile embedded device. Locally generated radio signals can be used in conjunction with the commercial FM radio signals to improve localization accuracy.

20 Claims, 3 Drawing Sheets

(56) References Cited

U.S. PATENT DOCUMENTS

| | | | |
|---|---|---|---|
| 2010/0075695 A1* | 3/2010 | Haughay et al. | 455/456.1 |
| 2010/0109842 A1 | 5/2010 | Patel et al. | |
| 2010/0120447 A1* | 5/2010 | Anderson et al. | 455/456.1 |
| 2010/0127836 A1 | 5/2010 | Huang et al. | |
| 2010/0178938 A1* | 7/2010 | Ingrassia et al. | 455/456.3 |
| 2010/0227626 A1* | 9/2010 | Dressler et al. | 455/456.1 |
| 2010/0285763 A1* | 11/2010 | Ingrassia et al. | 455/185.1 |
| 2010/0309051 A1 | 12/2010 | Moshfeghi | |
| 2010/0309790 A1* | 12/2010 | Polakos | 370/241 |
| 2011/0034180 A1* | 2/2011 | Walley et al. | 455/456.1 |
| 2011/0039517 A1* | 2/2011 | Wigren et al. | 455/404.2 |
| 2011/0065450 A1 | 3/2011 | Kazmi | |
| 2011/0183688 A1* | 7/2011 | Dietrich et al. | 455/456.1 |
| 2011/0256890 A1* | 10/2011 | Polakos | 455/456.5 |
| 2011/0269479 A1* | 11/2011 | Ledlie | 455/456.1 |
| 2011/0306354 A1* | 12/2011 | Ledlie et al. | 455/456.1 |
| 2011/0319097 A1* | 12/2011 | Wirola et al. | 455/456.1 |
| 2012/0056785 A1* | 3/2012 | Jovicic et al. | 342/450 |
| 2012/0072106 A1* | 3/2012 | Han et al. | 701/410 |
| 2012/0078894 A1* | 3/2012 | Jiang et al. | 707/723 |
| 2012/0191512 A1* | 7/2012 | Wuoti et al. | 705/14.1 |
| 2012/0208500 A1* | 8/2012 | Ledlie et al. | 455/410 |
| 2012/0214515 A1* | 8/2012 | Davis et al. | 455/456.3 |
| 2012/0226554 A1* | 9/2012 | Schmidt et al. | 705/14.58 |
| 2012/0290636 A1* | 11/2012 | Kadous et al. | 709/203 |
| 2012/0302263 A1* | 11/2012 | Tinnakornsrisuphap et al. | 455/456.6 |

OTHER PUBLICATIONS

Papliatseyeu, et al., "FINDR: Low-Cost Indoor Positioning Using FM Radio", Proceedings of MobilWare, vol. 07, Apr. 2009, pp. 1-13.

Miura, et al., "Indoor Localization for Mobile Node Based on RSSI", Proceedings of the 11th international conference, KES 2007 and XVII Italian workshop on neural networks conference on Knowledge-based intelligent information and engineering systems: Part III, Sep. 2007, pp. 1065-1072.

Sayrafian-Pour, et al., "A Robust Model-based Approach to Indoor Positioning Using Signal Strength", IEEE 19th International Symposium on Personal, Indoor and Mobile Radio Communications, Sep. 15-18, 2008, pp. 1-5.

Krumm, et al., "RightSPOT: A Novel Sense of Location for a Smart Personal Object", Ubiquitous Computing, 5th International Conference, Oct. 12-15, 2003, pp. 36-43.

Matic, et al., "Tuning to Your Position: FM-radio based Indoor Localization with Spontaneous Recalibration", IEEE International Conference on Pervasive Computing and Communications (PerCom), Mar. 29-Apr. 2, 2010, pp. 642-656.

Haeberlen, et al., "Practical robust localization over large-scale 802.11 wireless networks", Proceedings of the 10th ACM International Conference on Mobile Computing and Networking (MOBICOM'04), Sep. 2004, pp. 70-84.

Tarzia, et al., "Demo: Indoor Localization Without Infrastructure Using the Acoustic Background Spectrum", Proceedings of the 9th International Conference on Mobile Systems, Applications, and Services (MobiSys 2011), Jun. 28-Jul. 1, 2011, pp. 385-386.

* cited by examiner

INDOOR LOCALIZATION USING COMMERCIAL FREQUENCY-MODULATED SIGNALS

BACKGROUND

Accurately determining the location of mobile embedded devices (such as smartphones) in indoor environments can be difficult. A global positioning systems (GPS) cannot be used because the needed satellite signals are hard to receive indoors because they are blocked by the walls of the building.

There are a number of existing approaches to indoor localization. One approach is a WiFi®-based indoor localization (WiFi® is a registered trademark of the WiFi Alliance in Austin, Texas). In general, this type of approach records the signal strength from WiFi® access points in the immediate vicinity. Given the location of the WiFi® access points, the location of the mobile device can be calculated. Similar approaches have also been used where FM radio transmitters deployed in the building are used instead of WiFi® signals.

Another approach is proximity-based indoor localization. This type of approach uses a large number of low-power radios (such as RFIDs, low-power Bluetooth® devices (Bluetooth® is a registered trademark of the Bluetooth® Special Interest Group in Kirkland, Wash.), FM radio transmitters) that are deployed in every room or location that needs to be localized. The mobile embedded device detects proximity to and obtains its location from the nearest low-power radio source or sources.

Each of these approaches measure a signal strength between the mobile embedded device and the transmitter. The indoor space of the building then is profiled by creating a map of the signal strength. For example, this profiling may occur by measuring the signal strength along every meter of the indoor space and recording each of the record wireless access points that can be connected to at each location. This collection (or vector) of signal strengths becomes the "fingerprint" of that indoor location. This is performed for a large numbers of locations within the building to create a fingerprint database that consists of pairs of ground truth locations and signal strength vectors.

Once the fingerprint database is obtained, any user can enter the building with his mobile embedded device and localize the device. The mobile embedded device will determine which local radio transmitters are within the range of the device, and will record the signal strength from these individual transmitters at the user's current location in the building. The fingerprint of the mobile embedded device at the location in the building is compared to the fingerprint database to find the closest match. The position that is associated to the closest fingerprint match in the database is assumed to be the location of the mobile embedded device in the building.

One problem, however, with using local radio transmitters (such as WiFi®) is that it operates at the 2.4 GHz range, which means that its signal strength is susceptible to human presence, device orientation, and presence of small objects in a room. Additionally, these parameters change over time, further impacting the signal strength of WiFi® signals, and leading to additional errors in the indoor localization.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the commercial FM radio signal indoor localization system and method enable indoor localization of mobile embedded devices (such as smartphones) using commercial frequency-modulated (FM) radio signals. In other words, embodiments of the system and method use commercial FM radio signal broadcasts to find which room in a building the device is located. Embodiments of the system and method use the commercial FM radio signals either alone or in combination with one or more other types of locally-generated radio signals. These are radio signals that are generated locally in the close vicinity or within the building. These other types of locally-generated radio signals include WiFi®, Bluetooth®, and local FM signals.

Commercial FM radio signals are used by embodiments of the system and method because there is an existing and large infrastructure of commercial FM radio stations throughout the country. This is especially true in urban areas. Moreover, because of the low frequency at which these signals operate, they achieve improved penetration through structures, walls and furniture over WiFi®, Bluetooth®, or most other radio signals. In addition, because of the wavelength, FM radio signals have improved resilience to small objects, human presence, and to multipath and fading effects. Further, a WiFi® receiver generally uses more power on a mobile embedded device that an FM radio receiver.

Embodiments of the system and method first build a database of commercial FM radio signal quality vectors that are used for the indoor localization. These signal quality vectors are used to generate a fingerprint at a specific location within the building. The building is profiled by measuring the radio signals at set locations in the building and obtaining fingerprints for the locations. These fingerprints then are stored in a fingerprint database along with the location at which they were recorded.

Later, when a user carries his mobile embedded device into a mapped building, embodiments of the system and method use the receiver in the device to automatically synchronize to the different available commercial FM radio stations. In some embodiments, other types of radio signals are also used. Next, one or more signal quality metrics are applied to each of the radio signals in order to construct a signal quality vector. There is a signal quality vector for each signal quality metric associated with a particular radio signal. Several different types of signal quality metrics of each type of radio signal may be used, including received signals strength indication (RSSI), signal-to-noise ratio (SNR), multipath indicators, and frequency offset indicators. The same process can be repeated for other available wireless signals, such as WiFi® signals, and the resulting signal vectors from each type of wireless signal can be combined to form a single signature.

Embodiments of the system and method then construct a fingerprint for the current location in the building using the signal quality vectors. This current location fingerprint is compared to the fingerprints in the fingerprint database. The closest match is found between the current location fingerprint and a fingerprints in the fingerprint database. The stored fingerprint in the database that is the closest match to the current location fingerprint is designated as the current location in the building of the mobile embedded device.

It should be noted that alternative embodiments are possible, and steps and elements discussed herein may be changed, added, or eliminated, depending on the particular embodiment. These alternative embodiments include alternative steps and alternative elements that may be used, and structural changes that may be made, without departing from the scope of the invention.

DRAWINGS DESCRIPTION

Referring now to the drawings in which like reference numbers represent corresponding parts throughout.

DETAILED DESCRIPTION

In the following description of embodiments of a commercial FM radio signal indoor localization system and method reference is made to the accompanying drawings, which form a part thereof, and in which is shown by way of illustration a specific example whereby embodiments of the commercial FM radio signal indoor localization system and method may be practiced. It is to be understood that other embodiments may be utilized and structural changes may be made without departing from the scope of the claimed subject matter.

I. Commercial Frequency-Modulated (FM) Radio Signals

Embodiments of the commercial FM radio signal indoor localization system and method make use of commercial FM radio signals, such as those used by commercial FM radio stations. Currently, the FM band occupies 87.8-108 MHz, a total of 20.2 MHz and 101 channels. There are usually multiple FM radio stations available at a given location. In addition, some transmission towers are shared by several FM stations.

Commercial FM broadcasting is usually strong enough for outdoor reception. In addition, the indoor penetration of commercial FM radio signal is also high. The wavelength of the FM radio signals is about 3 meters. Thus indoor propagation is less sensitive to the smaller objects, but is more determined by large obstacles such as walls. For the same reason, FM signals are less susceptible to human presence and orientation. This means that FM radio signals are typically more stable in an indoor environment than radio signals of shorter wavelength, such as WiFi® and Bluetooth®.

Moreover, FM receivers are widely available in mobile embedded devices (such as smartphones) due to their small footprint and low cost. As compared to Wi-Fi®, FM receivers also consume much less energy (about 15 mW versus 300 mW). Thus, compared to other types of radio signals (such as Wi-Fi®), commercial FM radio signals require less power, are less susceptible to human presence and small objects, and have improved penetration.

II. System Overview

Figure 1:
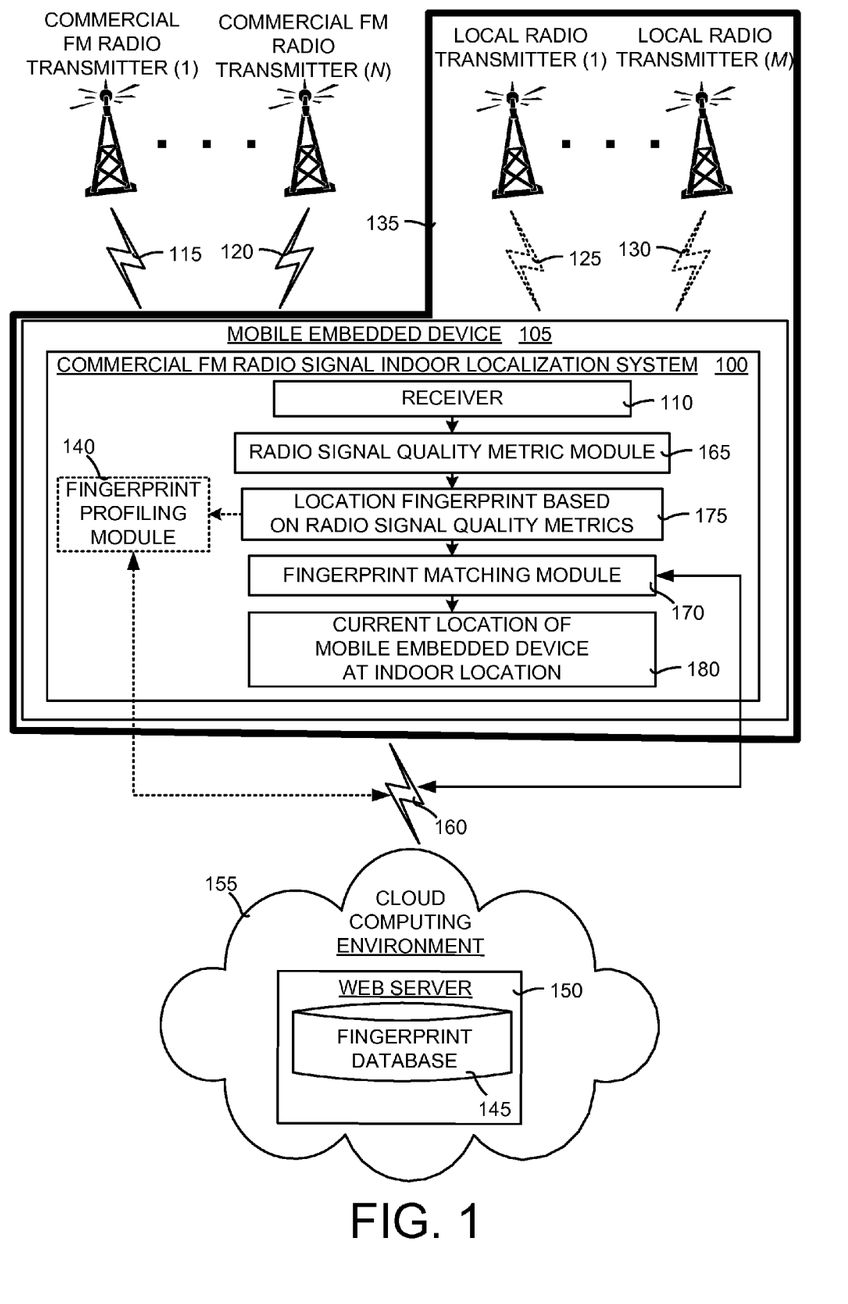
FIG. 1 is a block diagram illustrating a general overview of embodiments of the commercial FM radio signal indoor localization system and method implemented in a computing environment.

Embodiments of the commercial FM radio signal indoor localization system and method leverage commercial FM radio signals transmitted by already deployed FM radio towers to profile indoor locations and perform signature-based indoor localization of a mobile embedded device. FIG. 1 is a block diagram illustrating a general overview of embodiments of the commercial FM radio signal indoor localization system 100 and method implemented in a computing environment. In particular, embodiments of the commercial FM radio signal indoor localization system 100 and method are shown implemented on an mobile embedded device 105 (such as a smartphone).

Embodiments of the commercial FM radio signal indoor localization system 100 and method include a receiver 110 that is capable of receiving radio signals. These radio signals may be a variety of types of radio signals. However, in each embodiment of the system 100 and method the receiver 110 is capable of receiving commercial FM radio signals broadcasted by FM radio transmitters. These FM radio transmitters include N number of commercial FM radio transmitters. As shown in FIG. 1, the N number of commercial FM radio transmitters include commercial FM radio transmitter (1) to commercial FM radio transmitter (N), where N can be any positive integer from 1 or more.

It should be noted that the term "commercial" is used to denote that the commercial FM radio transmitters (1) to (N) broadcast their FM radio signals over a wide area. These FM radio signals are broadcast wirelessly over the airwaves, as denoted by the first communication link 115 from commercial FM radio transmitter (1) to the mobile embedded device 105 and the second communication link 120 from commercial FM radio transmitter (N) to the mobile embedded device 105. Typically, the commercial FM radio transmitters (1) to (N) will be associated with one or more commercial FM radio stations. Moreover, these transmitters typically will broadcast their FM radio signals over a wide area involving several square miles, such as tens or hundreds of square miles.

Moreover, a commercial FM radio signal is not dedicated only to the indoor localization process, unlike most existing techniques. In fact, the commercial FM radio signal's primary intent is not for indoor localization but for carrying radio broadcasts. Using commercial FM radio signals does not require the deployment of any device in any building. This also limits the cost associated with large-scale deployment of transmitters throughout a building.

Some embodiments of the commercial FM radio signal indoor localization system 100 and method also include using local radio transmitters. It should be noted the term "local" is used to indicate that the radio signals are broadcast over a short geographic range, such as less than a half mile or so. Typically, these local radio transmitters are designed to transmit within a building, such as with a WiFi® network.

As shown in FIG. 1, these optional local radio transmitters include local radio transmitter (1) to local radio transmitter (M), where M is some positive integer that is 1 or greater. These local radio signals are broadcast wirelessly locally over the airwaves, as denoted by the third communication link 125 from local radio transmitter (1) to the mobile embedded device 105 and the fourth communication link 130 from local radio transmitter (M) to the mobile embedded device 105. The local radio transmitter (1) to (M) are optional, as denoted by the dotted third communication link 125 and the dotted fourth communication link 130. The local radio transmitters (1) to (M) may be any type of radio signal, such as a WiFi®, Bluetooth®, or even a local non-commercial FM radio signal.

These local radio transmitters (1) to (M) typically have a short geographic range, such as within an enclosed building or structure. FIG. 1 illustrates this building 135 (or structure) as a heavy solid line. Note that the mobile embedded device 105 and the optional local radio transmitters (1) to (M) are located within the building 135.

Embodiments of the commercial FM radio signal indoor localization system 100 and method include an optional fingerprint profiling module 140. The optionality of the module 140 is shown by the dotted lines around the module 140. The module 140 is used during a profiling stage of the method to profile the radio signal fingerprints at various location in the building 135. These fingerprints are stored in a fingerprint database 145. In some embodiments, the fingerprint database resides on a web server 150 in a cloud computing environment 155. The cloud computing environment is in communication with the mobile embedded device 105 over a fifth communications link 160.

The two-way communication between the fingerprint profiling module 140 and the fifth communications link 160 is shown as a dotted two-way arrow to indicate that this the profiling is an optional process. In reality, the profiling is done at least once in order to populate the fingerprint database 145. However, the fingerprint profiling module 140 does not have to be performed on the mobile embedded device 105 and may be performed with any other type of devices capable of receiving the radio signals and generating the associated fingerprints. Fingerprints can also be automatically crowd-sourced by real users as they check-in to different business from their mobile devices. Every time a check-in is taking place, the signal vectors are recorded on the mobile device, annotated with the location of the business the user checked in and uploaded to the fingerprint database.

Once the fingerprint database 145 is populated and the building 135 is profiled, any mobile embedded device containing embodiments of the system 100 and method can be determine a location of the device 105 within the building 135, even without the optional fingerprint profiling module 140. In FIG. 1, the optional fingerprint profiling module 140 is shown on the mobile embedded device 105 merely for ease of describing embodiments of the system 100 and method.

Embodiments of the commercial FM radio signal indoor localization system 100 and method include a radio signal quality metric module 165 and a fingerprint matching module 170. In order to find a location of the mobile embedded device 105 once the fingerprint database 145 has been populated, embodiments of the system 100 and method receive radio signals on the receiver 110 and process these radio signals using the radio signal quality metric module 165. Embodiments of the module 165 use one or more signal quality metrics to measure a signal quality of the incoming radio signals.

The signal quality of the incoming signals is used to generate a location fingerprint 175 based on the signal quality metrics. This location fingerprint 175 is used to update the fingerprint database 145. In addition, the location fingerprint 175 is process by the fingerprint matching module 170 in order to determine a current location 180 of the mobile embedded device 105 at the indoor location. This process is explained in more detail below.

II.A. Fingerprint Profiling Module

Some embodiments of the commercial FM radio signal indoor localization system 100 and method include the fingerprint profiling module 140. The module 140 is used during a profiling stage of the method to profile the radio signal fingerprints in the building 135. Specifically, at a given location inside the building 135, the desired signal quality metrics are recorded using the receiver 110 and the radio signal quality metric module 165. This is performed at the given location for every radio signal frequency (or radio station) that the mobile embedded device 105 can receive.

This collection of radio signal quality metric information across each of the plurality of radio signals becomes a "signature" or fingerprint for the given location in the building 135. Whenever a user is in an unknown location in the building 135, the mobile embedded device 105 uses a current location fingerprint generated from the plurality of radio signals to and compares it against the fingerprint database 145 of already collected fingerprints. As explained in detail below, the closest fingerprint from the fingerprint database 145 is selected and its corresponding location is assumed to be the current location of the user.

In some embodiments of the commercial FM radio signal indoor localization system 100 and method the fingerprint profiling module 140 is not used. Instead, the GPS location of the mobile embedded device 105 can be associated with signal quality vectors (described below). This avoids the need to profile the entire building 135. As the user checks into a business in the building 135 the map of the business will be known to the mobile embedded device 105. This means that the GPS location of the mobile embedded device 105 can be associated with the signal quality vectors and the fingerprint database for the business in the building. In this case, there is longer a need to manually fingerprint the entire building. In many cases the user's consent will be obtained prior to releasing any user data (such as the user's location).

III. Operational Details

Figure 2:
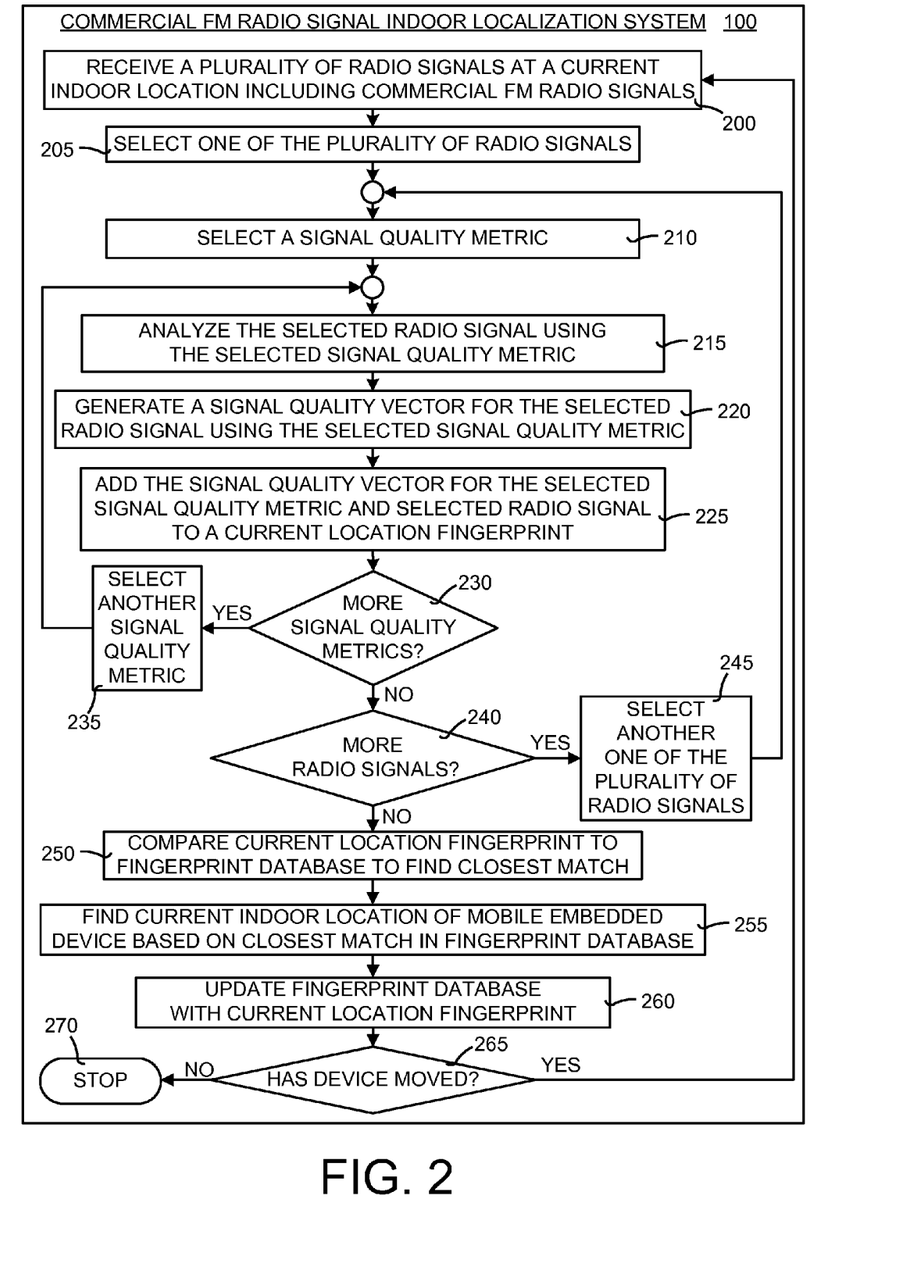
FIG. 2 is a flow diagram illustrating the detailed operation of embodiments of the commercial FM radio signal indoor localization system and method shown in FIG. 1.

FIG. 2 is a flow diagram illustrating the detailed operation of embodiments of the commercial FM radio signal indoor localization system 100 and method shown in FIG. 1. As shown in FIG. 2, the operation of embodiments of the commercial FM radio signal indoor localization method begins by using the mobile embedded device 105 to receive a plurality of radio signals at a current indoor location (box 200). The plurality of radio signals includes at least one commercial FM radio signal.

In some embodiments, only commercial FM radio signals are used for the indoor localization of the mobile embedded device 105. In other embodiments, the commercial FM radio signal and other types of local radio signals are used. These two general embodiments will now be discussed in further detail.

III.A. Commercial FM Radio Signals for Indoor Localization

Some embodiments of the commercial FM radio signal indoor localization system 100 and method use only commercial FM radio signals for the plurality of radio signals to perform indoor localization. In these embodiments no other types of radio signals are used. Although a single commercial FM radio signal may be used for the indoor localization, improved results are obtained when using a plurality of commercial FM radio signals.

One advantage to commercial FM radio signals is that they are more robust than WiFi® radio signals. The receiver 110 on the mobile embedded device 105 is used to collect individual commercial FM radio signals. As explained below, the each commercial FM radio signal received is analyzed using a signal quality metric to obtain a signal quality vector. These vectors together constitute a fingerprint that defines the indoor location of the mobile embedded device 105.

The strength of the commercial FM radio signals does vary over the course of the day. Moreover, there is some variation of signal quality metrics over different receivers. However, it has been shown that the variation is not that high to prevent embodiments of the commercial FM radio signal indoor localization system 100 and method from performing the indoor localization.

III.B. Combined Commercial FM Radio Signals and Local Radio Signals

Some embodiments of the commercial FM radio signal indoor localization system 100 and method pair the commercial FM radio signals with additional local (or locally-generated) radio signals. This allows these embodiments of the system 100 and method to exhibit a marked improvement in indoor localization over techniques that use the local radio signals alone.

In these combined embodiments, the plurality of radio signals includes the commercial FM radio signals along with the local radio signals. These local radio signals can include WiFi® radio signals, Bluetooth® radio signals, or even local FM radio signals from local FM radio transmitters. These embodiments can include virtually any combination or type of radio signals, as long as the commercial FM radio signals are included.

In addition, signal quality metrics are used to analyze each type of radio signal in the plurality of radio signals. Because these embodiments have a plurality of different types of radio signals, the fingerprints in the fingerprint database 145 have a longer fingerprint that includes both the commercial FM radio signal fingerprint and fingerprint from the other types of radio signals.

These combined embodiments typically provide a higher indoor localization accuracy that using just the local radio signals or commercial FM radio signals alone. This means that the error is complementary of the error that is obtained using just the local radio signals along. Combined, the indoor localization becomes more accurate.

Referring again to FIG. 2, one of the plurality of radio signals is selected (box 205). Embodiments of the method then select a signal quality metric (box 210). These signal quality metrics include the received signals strength indication (RSSI), signal-to-noise ratio (SNR), multipath indicators, and the offset indicators. Each of these signal quality metrics will be discussed below. However, it should be noted that any physical layer signal quality indicator (or metric) can be used, besides the four listed above. Moreover, all, one, or any combination of the signal quality metrics may be used to analyze the plurality of radio signals.

III.C. Received Signal Strength Indication

The received signal strength indication (RSSI) is a signal quality metric that existing receivers report. However, one problem with the RSSI is that it is a high-level indication signal that because it is high level it contains more noise that low-level signals. More noise means more localization error.

It is desirable to use more low-level signal indicators in place of or to augment a signal quality vector. By using more indicators at the physical layer, we can generate more discriminative signatures can be generated, which improves indoor localization accuracy. Thus, instead of using only RSSI as the signal quality metric for a selected radio signal, embodiments of the system 100 and method can use other signal quality metrics in place of or in addition to the RSSI signal quality metric. These additional signal quality metrics include signal-to-noise ratio, multipath indicators, and frequency offset of signal indicators.

III.D. Signal-to-Noise Ratio

Another type of signal quality metric that can be used by embodiments of the system 100 and method is the signal-to-noise ratio (SNR). The SNR uses the fact that no wireless radio signal has a perfect incoming signal. There is some noise because it is a wireless transmission. The SNR measures the perturbation of the incoming radio signal by indicating how strong the actual signal is compared to the noise of the input signal. The higher the noise as denoted by the SNR, then the lower the confidence in the quality of the signal.

III.E. Multipath Indicators

Yet another type of signal quality metric that can be used by embodiments of the system 100 and method is multipath indicators. Whenever a wireless signal is transmitted, it is reflected when it meets metallic or other types of objects. This causes the receiver 110 to receive the original signal and a plurality of reflected signals. The receiver 110 rarely receives a single signal. It is usually receiving the original signal and its reflected signals.

The multipath indicators indicate how many of these reflected signals have been received. This is a valuable signal quality metric because it can characterize the physical space in which the person is occupying. This is because depending on the space in which the person is occupying (including the walls and furniture setup), the multipath indicators can be used to characterize the room and therefore find the indoor location.

III.F. Frequency Offset of Signal

Still another type of signal quality metric that can be used by embodiments of the system 100 and method is indicators of the frequency offset of the signal. The receiver 110 receives multiple signals at virtually the same time. These multiple signals, because they travel different distances, usually have some delay that is translated into frequency offset. This can be used as a signal quality metric of the incoming signal.

Referring again to FIG. 2, once the signal quality metric is selected, embodiments of the method then analyze the selected radio signal using the selected signal quality metric (box 215). A signal quality vector for the selected radio signal then is generated using the selected signal quality metric (box 220). This signal quality metric corresponding to the selected signal quality metric and the selected radio signal is added to a current location fingerprint (box 225).

A determination then is made as to whether there are additional signal quality metrics that will be used on the selected radio signal (box 230). If so, then embodiments of the method select another signal quality metric (box 235). This newly selected signal quality metric then is used to analyze the selected radio signal (box 215) and generate a signal quality vector (box 220). This signal quality vector for the newly selected signal quality metric is added to the current location fingerprint (box 225).

If there are no additional signal quality metrics to be processed for the selected radio signal, then a determination is made as to whether there are additional radio signals to process (box 240). If so, then embodiments of the method select another one of the plurality of radio signal (box 245). Embodiments of the method then process this selected radio signal as described above in connection with boxes 210, 215, 220, 225, 230, and 235.

If there are no more radio signals to process, then embodiments of the method compare the current location fingerprint to fingerprints in the fingerprint database 145 (box 250). The fingerprint in the fingerprint database 145 that most closely matches the current location fingerprint is found. This "closest match" means that the signal quality vectors of the current location fingerprint and the fingerprint in the fingerprint database 145 that is the closest match have values that are nearest each other, as compared to the other fingerprints in the fingerprint database 145.

Embodiments of the system 100 and method can use any one of a variety of techniques to find the closest match between fingerprints. In general, these techniques basically are given a fingerprint to be localized and the fingerprint database 145, and then find which entry in the fingerprint database 145 is the closest to the given fingerprint. These techniques include distance metric techniques that match the given fingerprints with the fingerprint database 145. In addition, any type of metric, and any type of smoothing on top of the metric can be used to compare the signal quality vectors obtained from the mobile embedded device 105 to the fingerprint database 145.

Referring again to FIG. 2, embodiments of the method then find a current indoor location of the mobile embedded device 105 based on the closest match in the fingerprint database 145 (box 255). In other words, the location corresponding to the fingerprint in the fingerprint database 145 that is the closest match to the current location fingerprint is designated as the current indoor location of the mobile embedded device 105.

The fingerprint database 145 then is updated with the current location fingerprint (box 260). This ensures that the fingerprint database 145 contains current fingerprint information about locations within the building 135. A determination then is made as to whether the mobile embedded device 105 has moved within the building 135 (box 265). If so, then the process described above is repeated for the plurality of radio signals to obtain an updated indoor location of the mobile embedded device 105. Otherwise, the process is completed 270 until the mobile embedded device 105 is moved again.

IV. Exemplary Operating Environment

Figure 3:
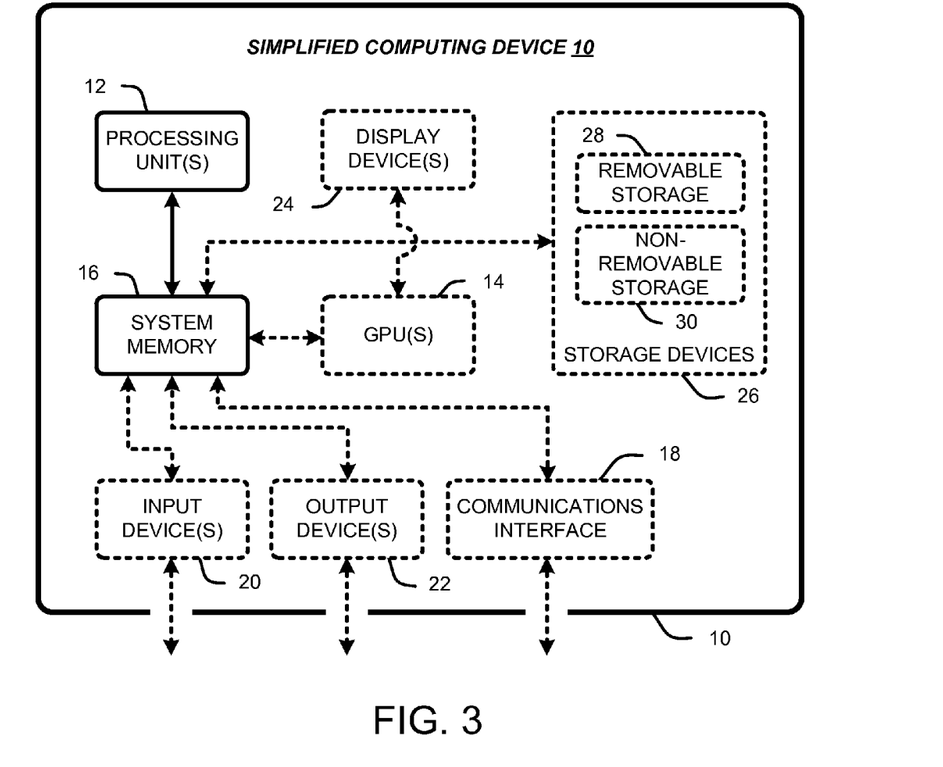
FIG. 3 illustrates a simplified example of a general-purpose computer system on which various embodiments and elements of the commercial FM radio signal indoor localization system and method, as described herein and shown in FIGS. 1-2, may be implemented.

Embodiments of the commercial FM radio signal indoor localization system 100 and method described herein are operational within numerous types of general purpose or special purpose computing system environments or configurations. FIG. 3 illustrates a simplified example of a general-purpose computer system on which various embodiments and elements of the commercial FM radio signal indoor localization system and method, as described herein and shown in FIGS. 1-2, may be implemented. It should be noted that any boxes that are represented by broken or dashed lines in FIG. 3 represent alternate embodiments of the simplified computing device, and that any or all of these alternate embodiments, as described below, may be used in combination with other alternate embodiments that are described throughout this document.

For example, FIG. 3 shows a general system diagram showing a simplified computing device 10. Such computing devices can be typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, minicomputers, mainframe computers, audio or video media players, etc.

To allow a device to implement embodiments of the commercial FM radio signal indoor localization system 100 and method described herein, the device should have a sufficient computational capability and system memory to enable basic computational operations. In particular, as illustrated by FIG. 3, the computational capability is generally illustrated by one or more processing unit(s) 12, and may also include one or more GPUs 14, either or both in communication with system memory 16. Note that that the processing unit(s) 12 of the general computing device of may be specialized microprocessors, such as a DSP, a VLIW, or other micro-controller, or can be conventional CPUs having one or more processing cores, including specialized GPU-based cores in a multi-core CPU.

In addition, the simplified computing device of FIG. 3 may also include other components, such as, for example, a communications interface 18. The simplified computing device of FIG. 3 may also include one or more conventional computer input devices 20 (e.g., pointing devices, keyboards, audio input devices, video input devices, haptic input devices, devices for receiving wired or wireless data transmissions, etc.). The simplified computing device of FIG. 3 may also include other optional components, such as, for example, one or more conventional computer output devices 22 (e.g., display device(s) 24, audio output devices, video output devices, devices for transmitting wired or wireless data transmissions, etc.). Note that typical communications interfaces 18, input devices 20, output devices 22, and storage devices 26 for general-purpose computers are well known to those skilled in the art, and will not be described in detail herein.

The simplified computing device of FIG. 3 may also include a variety of computer readable media. Computer readable media can be any available media that can be accessed by computer 10 via storage devices 26 and includes both volatile and nonvolatile media that is either removable 28 and/or non-removable 30, for storage of information such as computer-readable or computer-executable instructions, data structures, program modules, or other data. By way of example, and not limitation, computer readable media may comprise computer storage media and communication media. Computer storage media includes, but is not limited to, computer or machine readable media or storage devices such as DVD's, CD's, floppy disks, tape drives, hard drives, optical drives, solid state memory devices, RAM, ROM, EEPROM, flash memory or other memory technology, magnetic cassettes, magnetic tapes, magnetic disk storage, or other magnetic storage devices, or any other device which can be used to store the desired information and which can be accessed by one or more computing devices.

Retention of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer to a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Further, software, programs, and/or computer program products embodying the some or all of the various embodiments of the commercial FM radio signal indoor localization system 100 and method described herein, or portions thereof, may be stored, received, transmitted, or read from any desired combination of computer or machine readable media or storage devices and communication media in the form of computer executable instructions or other data structures.

Finally, embodiments of the commercial FM radio signal indoor localization system 100 and method described herein may be further described in the general context of computer-executable instructions, such as program modules, being executed by a computing device. Generally, program modules include routines, programs, objects, components, data structures, etc., that perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

Moreover, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer system comprising:
   one or more processing units; and
   one or more computer storage media storing computer-executable instructions which, when executed by the one or more processing units, cause the one or more processing units to:
      receive a commercial frequency-modulated radio signal on the computer system;
      analyze a signal-to-noise ratio of the commercial frequency-modulated radio signal to obtain a signal quality vector comprising the signal-to-noise ratio of the commercial frequency-modulated radio signal;
      analyze a multipath indicator of the commercial frequency-modulated radio signal to obtain another signal quality vector comprising the multipath indicator of the commercial frequency-modulated radio signal;
      add the signal quality vector comprising the signal-to-noise ratio of the commercial frequency-modulated radio signal to a current location fingerprint;
      add the another signal quality vector comprising the multipath indicator of the commercial frequency-modulated radio signal to the current location fingerprint; and
      compare the current location fingerprint including the signal quality vector and the another signal quality vector to a fingerprint database to obtain a current location of the computer system.

2. The computer system of claim 1, wherein the current location is an indoor location within a structure.

3. The computer system of claim 1, wherein the computer-executable instructions cause the one or more processing units to:
   analyze a received signal strength of the commercial frequency-modulated radio signal to obtain a further signal quality vector comprising a received signal strength of the commercial frequency-modulated radio signal; and
   add the further signal quality vector to the current location fingerprint, wherein the current location fingerprint also includes the further signal quality vector when compared to the fingerprint database to obtain the current location.

4. The computer system of claim 1, wherein the computer-executable instructions cause the one or more processing units to:
   analyze a further signal-to-noise ratio of a further commercial frequency-modulated radio signal; and
   add the further signal-to-noise ratio to the signal quality vector, wherein the signal quality vector includes the further signal-to-noise ratio when the current location fingerprint is compared to the fingerprint database to obtain the current location.

5. The computer system of claim 4, wherein the computer-executable instructions cause the one or more processing units to:
   analyze a further multipath indicator of a further commercial frequency- modulated radio signal; and
   add the further multipath indicator to the another signal quality vector, wherein the another signal quality vector includes the further multipath indicator when the current location fingerprint is compared to the fingerprint database to obtain the current location.

6. The computer system of claim 1, wherein the computer-executable instructions cause the one or more processing units to:
   find a matching fingerprint in the fingerprint database that is a closest match with the current location fingerprint to obtain the current location.

7. The computer system of claim 6, wherein the computer-executable instructions cause the one or more processing units to:
   designate a corresponding location represented by the matching fingerprint as the current location.

8. The computer system of claim 1, wherein the computer-executable instructions cause the one or more processing units to:
   update the fingerprint database with the current location fingerprint including the signal quality vector and the another signal quality vector.

9. A method implemented by at least one computer processing unit for performing localization of a mobile device within an indoor structure, the method comprising:
   obtaining a plurality of commercial frequency-modulated radio signals that are received within the indoor structure,
   generating a first signal quality vector comprising signal-to-noise ratios of the plurality of commercial frequency-modulated radio signals;
   adding the first signal quality vector to a current location fingerprint of the mobile device;
   analyzing frequency offset indicators of the plurality of commercial frequency-modulated radio signals;
   generating a second signal quality vector comprising the frequency offset indicators of the plurality of commercial frequency-modulated radio signals;
   adding the second signal quality vector to the current location fingerprint of the mobile device; and
   comparing the current location fingerprint comprising the first signal quality vector and the second signal quality vector to a fingerprint database to find a current location of the mobile device within the indoor structure.

10. The method of claim 9, further comprising:
    analyzing received signal strengths of the plurality of commercial frequency-modulated radio signals;
    generating a third signal quality vector comprising the received signal strengths of the plurality of commercial frequency-modulated radio signals; and
    adding the third signal quality vector to the current location fingerprint, wherein the current location fingerprint also includes the third signal quality vector when compared to the fingerprint database to find the current location.

11. The method of claim 9, further comprising:
analyzing multipath indicators of the plurality of commercial frequency-modulated radio signals;
generating a third signal quality vector comprising the multipath indicators of the plurality of commercial frequency-modulated radio signals; and
adding the third signal quality vector to the current location fingerprint, wherein the current location fingerprint also includes the third signal quality vector when compared to the fingerprint database to find the current location.

12. The method of claim 9, further comprising finding a matching fingerprint in the fingerprint database that matches the current location fingerprint to find the current location.

13. The method of claim 12, further comprising designating a particular location corresponding to the matching fingerprint in the fingerprint database as the current location of the mobile device within the indoor structure.

14. The method of claim 13, further comprising updating the fingerprint database with the current location fingerprint comprising the first signal quality vector and the second signal quality vector such that the current location is associated with the current location fingerprint in the fingerprint database.

15. The method of claim 9, further comprising populating the fingerprint database by recording signal quality metrics at various locations within the indoor structure and associating the signal quality metrics with the various locations as corresponding fingerprints of the various locations.

16. A mobile device comprising:
one or more processing units; and
one or more computer storage media storing computer-executable instructions which, when executed by the one or more processing units, cause the one or more processing units to:
receive a commercial frequency-modulated radio signal on the mobile device;
receive a locally-generated radio signal on the mobile device;
analyze the commercial frequency-modulated radio signal and the locally-generated radio signal using signal quality metrics, the signal quality metrics including a signal-to-noise ratio metric representing a signal-to-noise ratio of the commercial frequency-modulated radio signal and another signal-to-noise ratio of the locally-generated radio signal;
generate signal quality vectors from the signal quality metrics, the signal quality vectors comprising an individual signal quality vector that includes the signal-to-noise ratio of the commercial frequency-modulated radio signal and another individual signal quality vector that includes the another signal-to-noise ratio of the locally-generated radio signal;
add the signal quality vectors to a current location fingerprint of the mobile device; and
find a current location of the mobile device within a building using the current location fingerprint.

17. The mobile device of claim 16, wherein the computer-executable instructions cause the one or more processing units to:
analyze another commercial frequency-modulated radio signal to determine another signal-to-noise ratio of the another commercial frequency-modulated radio signal; and
add the another signal-to-noise ratio to the individual signal quality vector and the current location fingerprint to find the current location of the mobile device.

18. The mobile device of claim 17, wherein the locally-generated radio signal comprises a WiFi® radio signal, a Bluetooth® radio signal, or another frequency-modulated radio signal.

19. The mobile device of claim 18, wherein the computer-executable instructions cause the one or more processing units to:
compare the current location fingerprint to a fingerprint database to find a matching fingerprint that matches with the current location fingerprint; and
designate a corresponding location associated with the matching fingerprint as the current location of the mobile device within the building.

20. The mobile device of claim 19, wherein, of all fingerprints in the fingerprint database, the matching fingerprint most closely matches the current location fingerprint.

* * * * *